United States Patent [19]
Fukui et al.

[11] Patent Number: 5,253,525
[45] Date of Patent: Oct. 19, 1993

[54] DEVICE FOR DETECTING ANGULAR VELOCITY

[75] Inventors: Shinji Fukui; Takaharu Idogaki, both of Okazaki; Toshihisa Ishihara, Nishio; Hideki Kusunoki, Toyota; Hideo Inoue, Ashigarakami; all of Japan

[73] Assignees: Nippon Soken, Inc, Nishio; Toyota Jidosha Kabushiki Kaisha, Toyoto, Japan

[21] Appl. No.: 662,295

[22] Filed: Mar. 1, 1991

[30] Foreign Application Priority Data

Mar. 2, 1990 [JP] Japan .................. 2-52503
Jan. 9, 1991 [JP] Japan .................. 3-000999

[51] Int. Cl.⁵ .................................. G01P 15/08
[52] U.S. Cl. .................................. 73/504; 73/516 R
[58] Field of Search .............. 73/504, 505, 516 R; 74/5 R

[56] References Cited

U.S. PATENT DOCUMENTS

| | | | |
|---|---|---|---|
| 3,148,456 | 9/1964 | Browning | 73/504 |
| 3,311,987 | 4/1967 | Blazek | 73/504 |
| 3,902,374 | 9/1975 | Hoffman et al. | 73/504 |
| 4,043,204 | 8/1977 | Hunter et al. | 73/516 R |
| 4,047,439 | 9/1977 | Russell et al. | 73/516 R |
| 4,192,189 | 3/1980 | Presley | 73/505 |
| 4,570,507 | 2/1986 | Hunter et al. | 74/5.12 |
| 4,845,988 | 7/1989 | Russell et al. | 73/516 R |
| 4,922,753 | 5/1990 | Idogaki et al. | 73/516 R |

FOREIGN PATENT DOCUMENTS

| | | |
|---|---|---|
| 3825088 | 2/1990 | Fed. Rep. of Germany . |
| 64-35381 | 2/1989 | Japan . |
| 2070244 | 9/1981 | United Kingdom . |

Primary Examiner—Hezron E. Williams
Assistant Examiner—Michael Brock
Attorney, Agent, or Firm—Cushman, Darby & Cushman

[57] ABSTRACT

An angular velocity sensor having a casing in which a disk shaped permanent magnet member is arranged so that it floats on a magnetic fluid filled in the casing. A Hall motor is provided for rotating the permanent magnet about its axis in the casing, and a detection unit is provided detecting an inclination of the magnet member about an axis which is transverse to the axis about which the magnet member rotates, which inclination is generated when the sensor is subjected to an angular movement. An angular velocity of such an angular movement is calculated from the detected degree of inclination of the magnet member.

19 Claims, 10 Drawing Sheets

DEVICE FOR DETECTING ANGULAR VELOCITY

BACKGROUND OF THE INVENTION

1. Field of the invention

The present invention relates to an apparatus for the detection of an angular speed of a moving object.

2. Description of the Related Art

In general, a conventional angular velocity sensor for the detection of the angular velocity utilizes a gyro, for example, a mechanical yaw rate gyro. In this known type of angular velocity detection device, an angular velocity is detected by a force applied to an object in a rotating coordinate system, and is used for a control of an attitude of a airplane or a navigational aid for an automobile.

The utilization of the gyro, however, always necessitates a rotating object for detecting an angular velocity. When a rotating member and an electric rotating motor and the like connected therewith are housed in a casing, such a rotating member and motor may be in contact with the casing because they are mounted on a gimbal. Thus a frictional force is generated which results in a reduction of the precision of a detection of the angular velocity.

SUMMARY OF THE INVENTION

An object of the present invention is to provide a device capable of precisely detecting an angular velocity by rotating a permanent magnet which is not in mechanical contact with a casing.

According to a present invention, an angular velocity detecting device is provided and is arranged in a field to which an angular movement is applied, said device comprising:

a casing;

a magnetic fluid filled in the casing;

a magnet member having a first axis for rotation and arranged inside the casing so that the magnet member is freely rotatable about the first axis while able to be declined with respect to the casing against the magnetic fluid, about at least one second axis transverse to the first axis, upon the application of said angular movement;

means for rotating the magnet member about said first axis without contacting the magnet member;

means for controlling the rotating means for maintaining a constant speed of the rotational speed of the magnet member about the first axis;

means for detecting a degree of declination of the magnetic member with respect to the casing while the magnetic member is rotated at a constant speed, and;

means for calculating an angular velocity of the movement in response to the detected degree of declination of the magnetic member with respect to the casing.

DESCRIPTION OF THE PREFERRED EMBODIMENTS

Embodiments of the present invention will be described with reference to the attached drawings.

Figure 1:
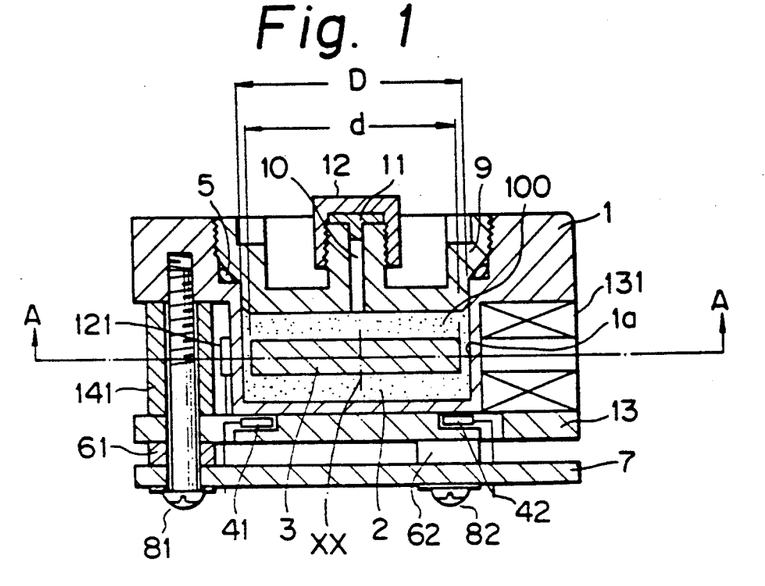
FIG. 1 is a schematic cross-sectional view of a device for detecting angular velocity, as a first embodiment of the present invention.
Figure 2:
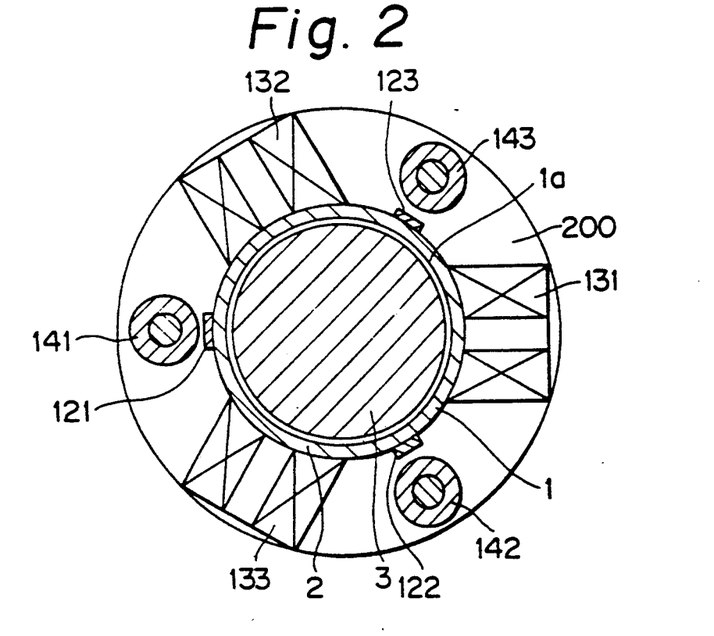
FIG. 2 is a cross sectional view taken along the line A—A in FIG. 1.

In FIGS. 1 and 2, reference numeral 1 denotes a casing connected to an appropriate member (not shown) of an object, the angular velocity of which is to be measured, such as a vehicle. The casing 1 is made from a material having a non-magnetizing and high electrical resistance property. A cap 9, made from the same material as that of the casing 1 is connected to the casing 1, to thereby form a complete casing in which a cylindrical space 100 having a predetermined volume is defined, and wherein a magnetizing fluid 2 and a disk-shaped, multi-pole, permanently magnetized magnet 3 are provided. The disk-shaped magnet 3 has a central axis XX, axially spaced apart surfaces, and a circumferential surface. The disk 3 is, for example, magnetized at four positions angularly spaced along the circumferential periphery thereof. As will be easily understood, a non-uniform density of the magnetizing fluid is obtained in the space 100, i.e., a density distribution is obtained in the space in accordance with the distribution of the strength of the magnetic field in the space 100.

As will be also easily understood, the inner cylindrical space 100 has a diameter D which is slightly larger than the diameter d of the permanent magnet disk 3, and the casing 1 defines an annular side wall 1a which allows the disk 3 to rotate about its axis.

The disk 3 includes the magnetizing fluid magnetically attached thereto. When the magnetizing fluid is attached thereto in free space, its width will have the measure Lmax. This measure Lmax is greater than the total axial thickness of the inner-cylindrical space. Of course, once the disk is located into the cylindrical space, the size of the magnetized fluid attached to the disk is truncated by the confines of inner cylindrical space. Accordingly, the maximum thickness of magnetic fluid that is magnetically attached to the disk in the inner cylindrical space is less than the thickness of the housing.

The magnetic fluid 2 as magnetically attached around the permanent magnet 3 serves not only as a lubricant which allows the permanent magnet 3 to rotate about its axis but also as a spring and a damper in the direction of the thickness of the magnet 3. As a result, a floating supporting of the magnet disk 3 in the center of the cylindrical space 100 is obtained, which allows the disk 3 to be surrounded by the casing 1 without being in contact therewith.

Reference numerals 41 and 42 denote Hall elements as an declination detection means for detecting a relative declination of the permanent magnet 3 and the casing 1. These Hall elements 41 and 42 are fixedly connected to a plate 13 in such a manner that they are symmetrical with respect to the rotation axis of the permanent magnet 3; i.e., the Hall elements 41 and 42 are arranged under a diametrically opposite relationship. The Hall elements 41 and 42 have terminals soldered to a terminal plate 7, and the plate 13 for mounting the Hall elements and the terminal plate 7 are connected to the casing 1 by screws 81, 82 and (not-shown) 83 through tubular spacers 141, 142 and 143 located between the plate 13 and the casing 1, and 61, 62 and (not-shown) 63 located between the plates 13 and 7.

An upper cap 9 is screwed to the casing 1 via an O-ring 5, a seal plug 11 made of a rubber material is inserted to an opening 10, for introducing a magnetizing fluid into the space 100, and an upper cap 12 is fitted above the plug 11.

In FIG. 2, angularly spaced coils 131, 132 and 133, and angularly spaced Hall elements 121, 122 and 123, are arranged along the outer circumference of the casing 1. The coils 131, 132 and 133, and Hall elements 121, 122 and 123, together with the permanent magnet 3, construct a Hall motor.

Figure 3:
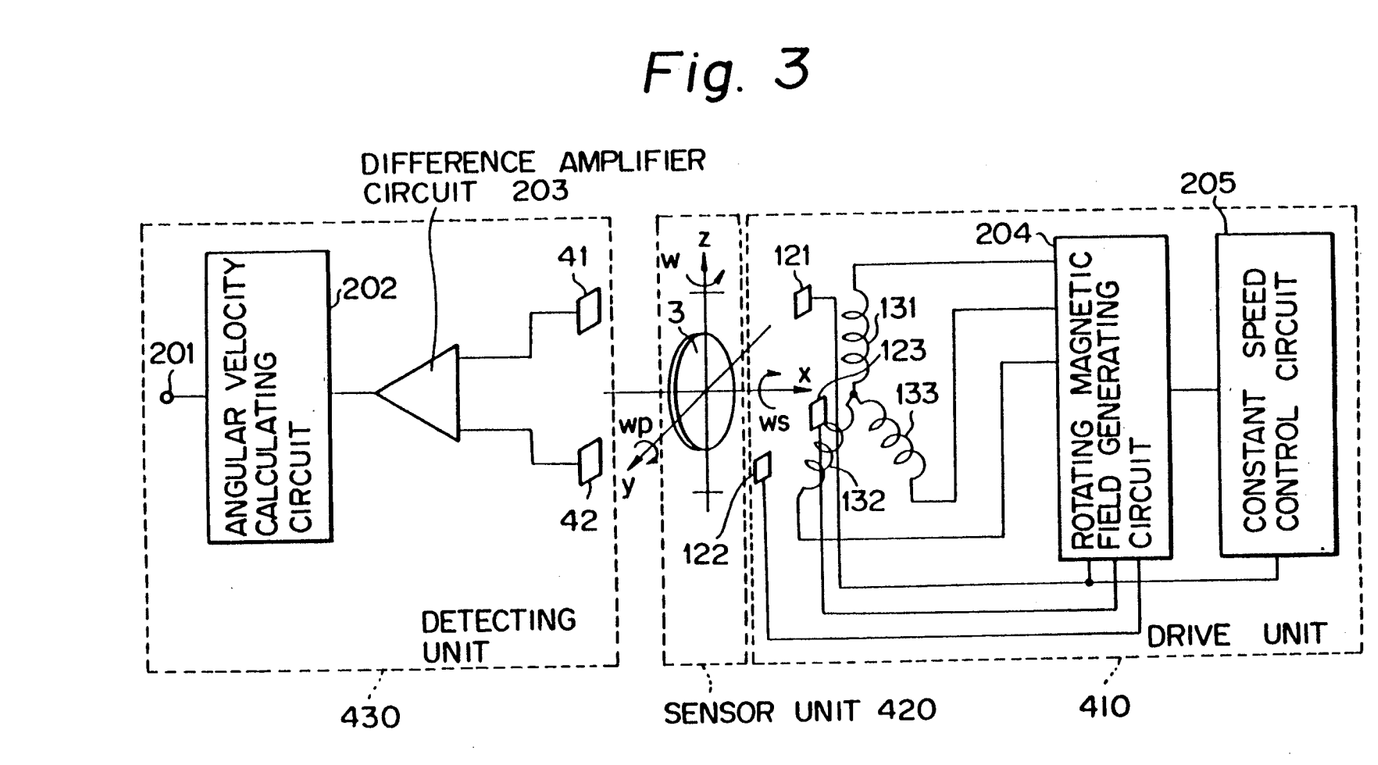
FIG. 3 is a schematic view of the device of the first embodiment.

FIG. 3 shows a diagrammatic view of the entire device according to the present invention, which is constructed by a drive unit 410, a sensor 420, and a detecting unit 430. The drive unit 410 is constructed by a circuit 204 for generating a rotating magnetic field, and a constant speed control circuit 205.

The rotating magnetic field generating circuit employs a three phase, all wave drive principle, to thereby obtain a rotating magnetic field having small fluctuations of the torque and rotational speed thereof. The three phase, all wave drive is preferably constructed by an integrated circuit, such as TA7259P from Toshiba Corp. The constant speed control circuit 205 is constructed by a PLL control integrated circuit, such as TC9142P. from Toshiba Corp. The sensor 420 is constructed as shown in FIG. 1 and 2, as already explained and the detection unit 430 is constructed by Hall elements 41 and 42 for the detection of a declination, a difference amplifier 203, and an angular speed calculation circuit 202. It should be noted that, in FIG. 1, the positioning of the Hall elements 41 and 42 for the detection of a declination is determined such that they are less influenced by a magnetic field generated by the rotating magnetic field generating coils 131, 132 and 133.

Figure 4:
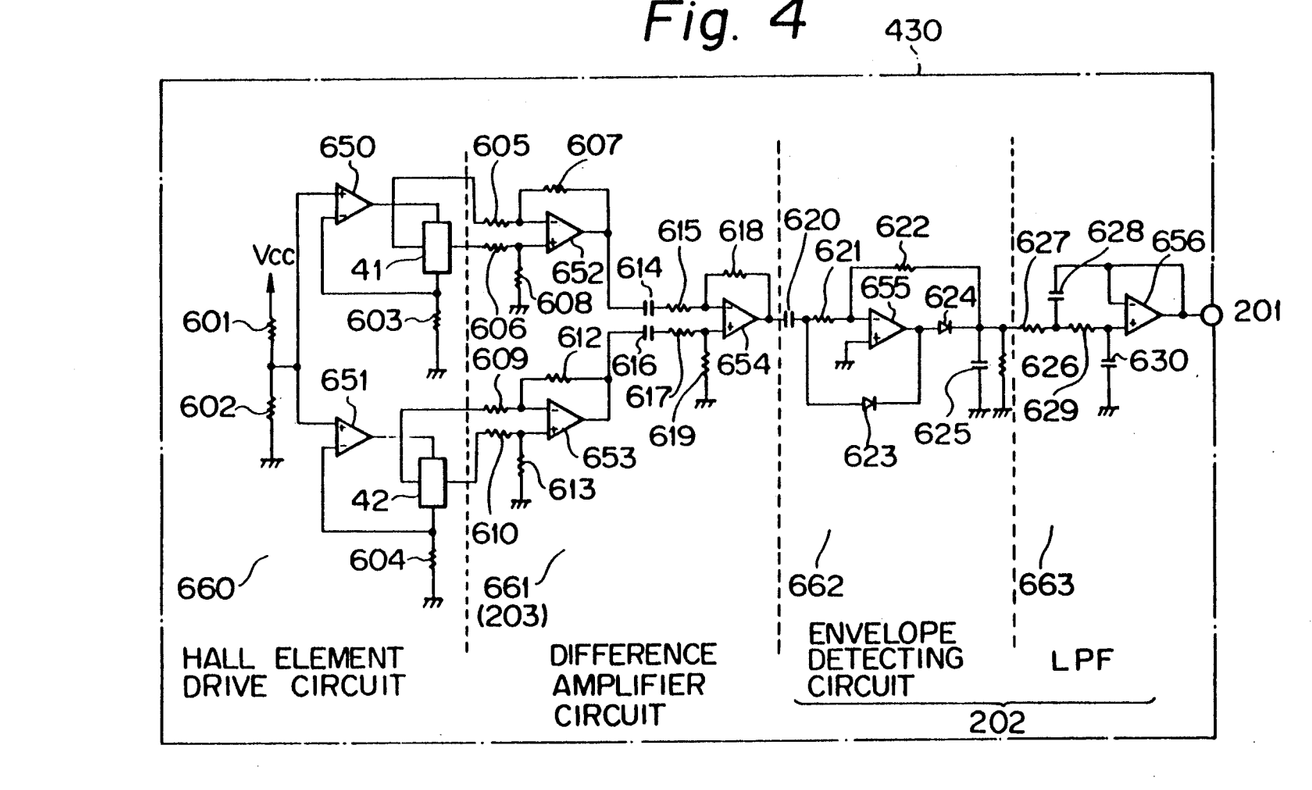
FIG. 4 shows details of a detecting circuit in FIG. 3.

FIG. 4 shows details of the angular velocity detecting unit 430, which is comprised of a Hall element driving circuit 660, a difference amplifier 661, an envelope detection circuit 662, and a low pass filter 663. First, the Hall circuit driving circuit 660 includes operating amplifiers 650 and 651 for an electric current feedback and having positive inputs connected to the ground via a resistor 602, negative inputs connected to the ground via resistors 603 and 604, respectively, and outputs connected to inlets of the Hall elements 41 and 42, respectively. The Hall elements 41 and 42 have second inlets connected to negative inputs of the operating amplifiers 650 and 651, respectively.

The difference amplifier circuit 661 includes operating amplifiers 652 and 653, which have positive first inlets connected to the ground via resistors 608 and 613, respectively, on one side, and connected to the outputs of the Hall elements 41 and 42 via resistors 606 and 610, respectively, on the other side, negative inlets connected to the second inlets of the Hall elements 41 and 42, via resistors 605 and 609, respectively, and outputs connected to self negative inputs, via resistors 607 and 612, respectively. The operating amplifier 654 has a negative input connected to the output of the operating amplifier 652 via a resistor 615 and alternate current coupling capacitor 614, a positive input connected to the output of the operating amplifier 653, via a resistor 617 and alternate current coupling capacitor 616, and an output connected to the self negative input via a resistor 618. The positive input of the operating amplifier 654 is also connected to the ground via a resistor 619.

The envelope detecting circuit 622 includes an operating amplifier 655 having a positive input connected to the ground, a negative input connected to the output of the operating amplifier 654 via a resistor 621 and alternate current coupling capacitor 620, and an output connected to a cathode of a diode 624. An anode of the diode 624 is connected to the negative input of the operating amplifier 655 via a resistor 622 and is grounded via a capacitor 625 and resistor 626. The output of the operating amplifier 655 is also connected to an anode of a diode 623, and the cathode of the diode 623 is connected to a point between the alternate current coupling capacitor 620 and the resistor 621.

The construction of the low pass filter 663 includes an operating amplifier 656 having a positive input grounded via a capacitor 630 and connected to the anode of the diode 624 via resistors 629 and 627, a negative input connected to a location between the resistors 627 and 629, via a capacitor 628, and an output connected to a terminal 201 and to the negative input thereof.

The rotating field generating circuit 204 causes the coils 131, 132 and 133 to generate a rotating magnetic field, which allows the permanent magnet 3 to rotate about its axis in the cylindrical chamber 100 at a constant velocity Ws. Assuming that the angular velocity sensor is mounted on a vehicle (not shown) so that the axis Z in FIG. 3 is vertically oriented, when a turning movement is applied to the vehicle, an angular velocity W is imparted to the permanent magnet 3 about a axis Z perpendicular to the spinning axis X of the permanent magnet 3, which causes a precession torque to be generated about the axis Y perpendicular to both of the axes X and Y, which causes a rotating torque to be generated in the permanent magnet 3 in the direction as shown by an arrow Wp. The magnetizing fluid 2 arranged around the permanent magnet 3 can operate as a damper with a spring in the direction of the axial thickness of the permanent magnet 3, so that the magnet 3 is inclined with respect to the casing 1 at an angle until the precession torque Wp and the spring force are balanced. This angle of the declination of the disk 3 is detected by the Hall elements 41 and 42 and amplified by the difference amplifier 203, and introduced into the angular velocity calculating circuit 202. The signals detected by the Hall elements 41 and 42 are amplified by the difference amplifier 203, and introduced into the angular velocity calculating circuit 202 by obtaining an electric signal having a voltage level which corresponds to the angular velocity applied to the casing 1. The difference amplifier system is employed to cancel the changes in the output voltages from the Hall elements 41 and 42 generated by the translational movement of the permanent magnet 3 in the cylindrical chamber 100 induced by an acceleration along the direction parallel to the axis X, because these changes in the Hall voltages have the same phase. With regard to the acceleration in the direction of the Y and Z axis, the difference in the inner diameter D of the cylindrical space 100 and the outer diameter d of the permanent magnet disk 3 is small enough that the side wall 1a, as a movement limiting means, can prevent any significant movement of the magnet 2 in the rotating plane thereof which is parallel to both of the axes Y and Z, which minimizes the change in the output voltage caused by such a translational movement of the disk to thereby decrease any possible error that may occur.

The operation of the angular velocity detecting part 430 in FIG. 4 is as follows. A constant electric current drive operation of the Hall elements 41 and 42 is obtained by the Hall element driving circuit 660. The difference amplifier 661 is constructed by first stage and second stage difference amplifiers which are connected with each other by the alternate current couplings 614 and 616. These A/C couplings serve to cut off various unbalances which may otherwise adversely affect the desired measurement, such as unbalanced voltages applied to the Hall elements, an unbalanced voltage-to-temperature characteristic between the Hall elements, unbalanced offset voltages applied to the first stage operating amplifiers, and unbalanced temperature drift characteristics. When a input angular velocity W is applied, the difference amplifier issues an output signal which has been as subjected to an amplitude modulation, and the angular velocity component can be obtained to thereby determine the envelope of the amplitude-modulated signal. An envelope detection operation is obtained by the envelope detection circuit 662, which includes a peak-to-peak detector. The envelope detected output signal from the detecting circuit 662 is introduced into the low pass filter 663, to remove any ripple components.

According to the first embodiment, the permanent magnet 3 is rotated by the magnetic type rotating means, and therefore, an advantage can be obtained such that a mechanical shaft between the magnet type rotating means and the permanent magnet 3 is not required. Furthermore, a difference between the inner diameter of the case and the outer diameter of the permanent magnet disk is small enough to substantially limit the movement of the disk along the diametric direction, which makes negligible any change in the output value due to such a movement, thereby reducing errors. Furthermore, the permanent magnet member 3 is in contact only with the magnetic fluid 2, and not with the remaining members, which increases the sensitivity of the detection of angular velocity to thereby allow the detection of a very small amount of angular velocity. A relatively simple construction is sufficient to obtain a precise detection of the angular velocity. A symmetric arrangement of the Hall elements for a detection of the declination of the permanent magnet disk with respect to the central axis of the disk 3 can cancel the changes in the output voltages from the hall elements when a movement without angular velocity of the vehicle is obtained, i.e., only a linear movement of the vehicle is obtained to cause the permanent magnet to make a translation movement, thereby providing an advantage in that there is not response to any acceleration that does not provide an angular velocity. Furthermore, the alternate current coupling by the A/C coupling capacitors 614 and 616 provides an advantage in that unbalanced voltages applied to the Hall elements 41 and 42 can be lessened. Finally, the floating arrangement of the rotating member 3 in the magnetizing fluid 2 is advantageous in that the device is substantially impervious to damage by an externally applied shock.

Figure 5:
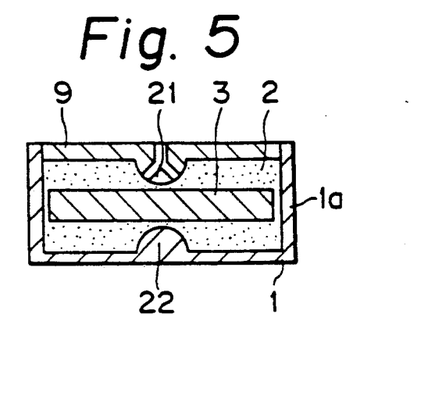
FIG. 5 is partial view of an essential part of a second embodiment of the present invention.

A second embodiment is shown in FIG. 5. This embodiment differs from the first embodiment only in the sensor 420, and therefore, the following explanation will be focused thereon, and a detailed explanation of the remaining parts will be omitted. In this embodiment, the cap and the casing 1 and 9 have opposite inner faces facing the permanent magnets 3, which faces define at the center portions thereof projections 21 and 22, respectively, having a semi-spherical shape. Note, these projected portions 21 and 22 are not in contact with the permanent magnet member 3. Namely, a small space remains between the projections 21 and 22 and the magnet 3, by which any movement of the permanent magnet member 3 is limited in the thickness direction thereof, i.e., perpendicular to the direction of the diameter of the disk 3. This construction makes it possible to limit not only a straight or translational movement in the diametric direction of the magnet 3 by the peripheral wall 1a but also a straight or translational movement in the direction which is parallel to the axial direction of the disk 3, i.e., the direction transverse to the diametrical direction of the magnet 3, and as a result, in this embodiment, only the rotational movement of the magnet 3 about the central rotational axis thereof, and about the diametric axis for declining same with respect to the casing 1, are allowed.

Figure 6:
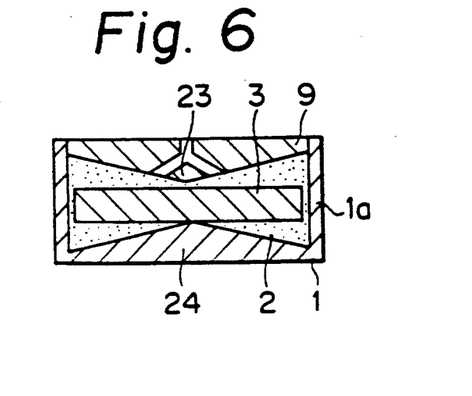
FIG. 6 is partial view of an essential part of a third embodiment of the present invention.

FIG. 6 shows a third embodiment which, similar to the second embodiment, is focused on the sensor portion. In this embodiment, the casing 1 and cap 9 also have facing conical inner surfaces projecting toward each other, whereby projections 23 and 24 facing the permanent magnet 3 are obtained. These conical shape projections 23 and 24 operate in the same way as those in the embodiment in FIG. 5, to limit unnecessary movement of the permanent magnet 3 other than a rotational movement thereof, about its own rotating axis, and any declining movement needed to obtain an increased precision of the measurement.

Figure 7:
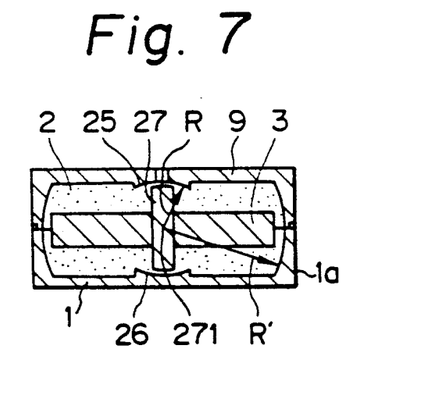
FIG. 7 is partial view of an essential part of a fourth embodiment of the present invention.

FIG. 7 shows a fourth embodiment of the sensor portion. In this embodiment, the permanent magnet 3 has at the center thereof an axial bore to which a shaft 27 is fixedly inserted so that the ends thereof project outward. The casing 1 is provided with facing inner walls which face the major planes of the disk 3, and the inner walls form axially faced concave recesses 25 and 26 having a diameter R. The casing 1 has, in a plane parallel to and including the axis of the shaft 27, an inner peripheral surface having an arc shape with a diameter R', which is adjacent to the free ends of the shaft 3. The ends of the shaft 27 are positioned adjacent to the concave recess 25 and 26 not in contact therewith, and as a result, the disk 3 can be rotated while the ends of the shaft 27 move along the recesses 25 and 26 as adjacent as possible thereto without coming into contact therewith.

Figure 8:
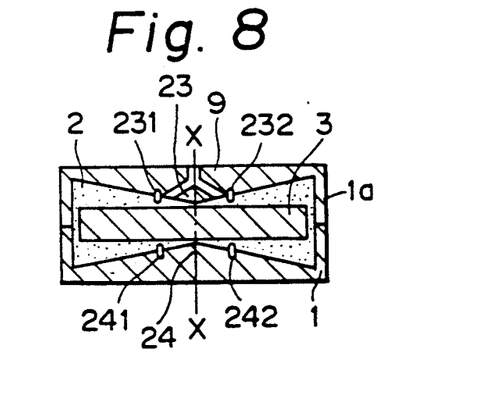
FIG. 8 is partial view of an essential part of a fifth embodiment of the present invention.

FIG. 8 shows fifth embodiment related to an improvement of the embodiment in FIG. 6. In this embodiment, a pair of opposite second projections 231 and 41, and a pair of needle shape opposite third projections 232 and 242, are formed on the facing walls of the case 1 such that these pairs of projections are arranged symmetrical to the axis X—X of the rotation of the disk 3. The diametric rotational movement of the magnet 3 is allowed only about the diametric axis, which is parallel to a plane formed by the projections 231 and 241, and 232 and 242, and as a result, an angular velocity along only a single diametric axis can be detected.

Figure 9:
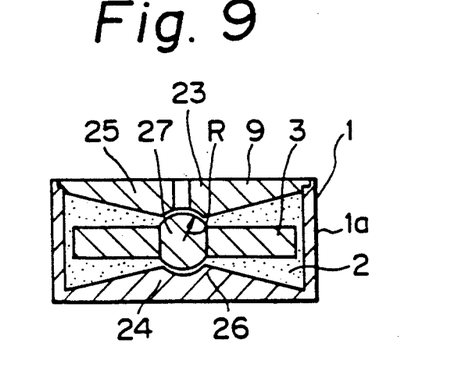
FIG. 9 is partial view of an essential part of a sixth embodiment of the present invention.

FIG. 9 is a combination of the third embodiment of FIG. 6 wherein the opposite walls facing the permanent magnet 3 are projected thereto so that they form conical shapes 24 and 25, and the fourth embodiment in FIG. 7 wherein a shaft 27 is fixed to the center of the magnet 3 so that the ends thereof are positioned adjacent to the concave recesses formed on the facing walls of the casing. In this embodiment, the ends of the shaft 27 are rounded so as to be complimentary to the concave shapes of the recesses.

In the second to sixth embodiments as explained above, the tubular peripheral wall 1a of the casing acts as a means for limiting the translational movement of the permanent magnet 3 in a direction transverse to the rotating axis X—X of the disk 3, but in place of this arrangement, in the third embodiment of FIG. 6 and fifth embodiment of FIG. 8, the projections 23 and 24 may come into contact with the permanent magnet 3 to limit such a translational movement of the magnet 3, and in such a case, the inner peripheral wall 1a of the casing 1 and the outer peripheral wall of the permanent magnet 3 can be largely distanced.

The embodiments shown in FIGS. 5 to 9 provide an angular velocity detecting device which is reliable when subjected to vibration or linear acceleration.

Figure 10:
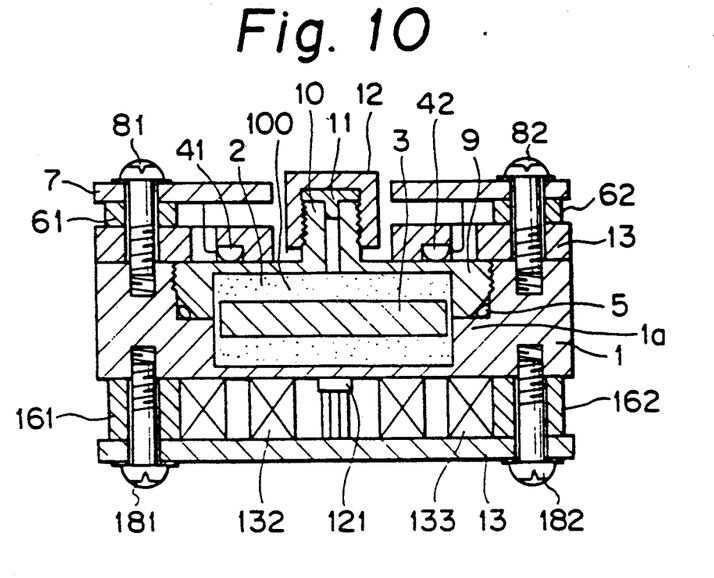
FIG. 10 is a view similar to FIG. 1 but showing a seventh embodiment of the present invention.

FIG. 10 shows a seventh embodiment of the present invention. This embodiment features rotating magnetic field generating coils 132, 133 and (not shown) 131, and pole detection Hall elements 121 and (not shown) 122 and 123 are arranged in a plane which is parallel to and axially spaced from the permanent magnet 3. The declination detecting Hall elements 41 and 42 are arranged on the plane axially spaced from the permanent magnet member 3 on the other side thereof opposite to the plane wherein the coils 132, 133 and 131, and the Hall elements 121, 122 and 123 are arranged. This embodiment is advantageous in that any magnetic influence from the Hall motor on the declination detecting Hall elements 41 and 42 becomes negligible, and as a result, the permanent magnet 3 may be magnetized along the direction of the thickness thereof.

Figure 11:
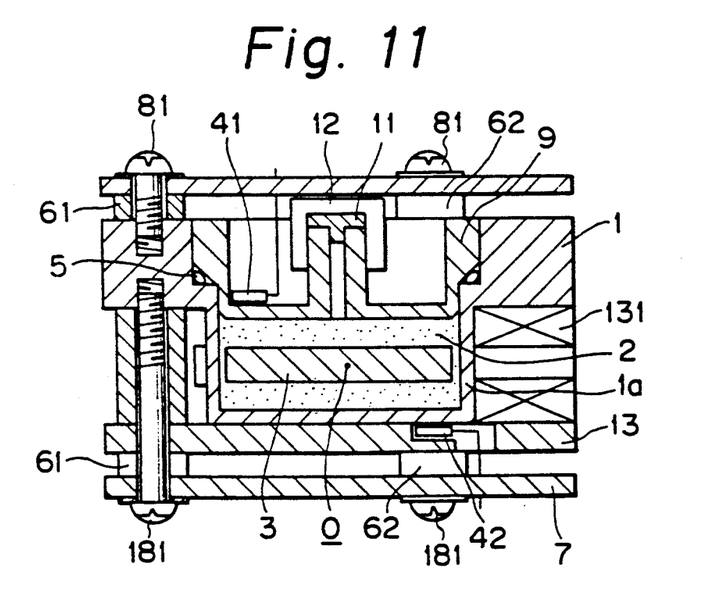
FIG. 11 is a view similar to FIG. 1 but showing an eighth embodiment of the present invention.

FIG. 11 shows an eighth embodiment in which the declination detection Hall elements 41 and 42 are arranged in a point symmetric relationship with respect to the center point 0 of the permanent magnet 3. Namely, the Hall element 41 is arranged on one side of the permanent magnet 3 and the Hall element 42 is arranged on the other side of the permanent magnet 3, in such a manner that the Hall elements 41 and 42 are diametrically spaced apart.

Figure 12:
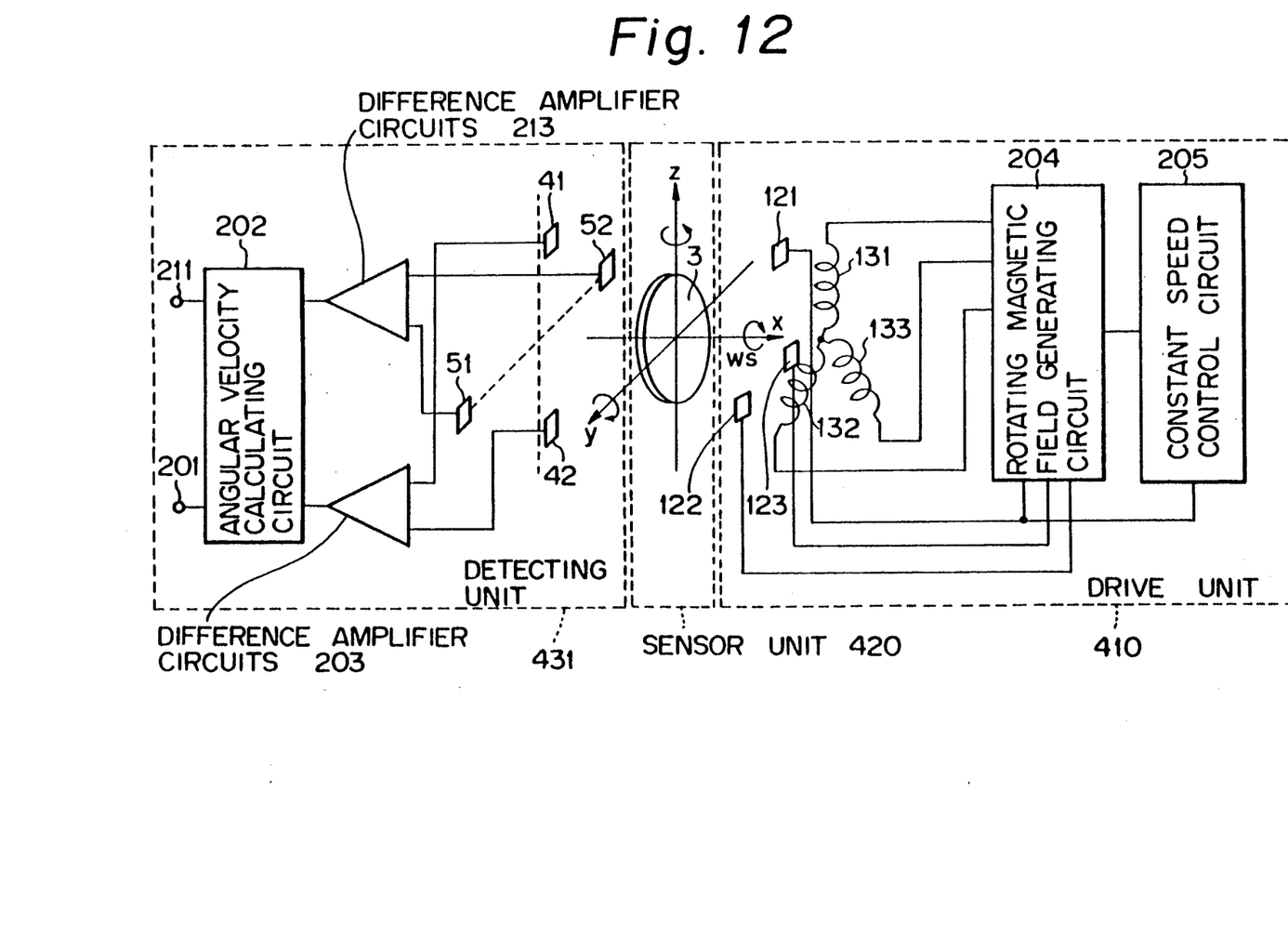
FIG. 12 is a view similar to FIG. 3 but showing a ninth embodiment of the present invention.

FIG. 12 shows a ninth embodiment of the present invention in which two pairs of 90 degree spaced Hall elements 41 and 42, and 51 and 52 are provided, to detect an angular velocity about two axes, i.e., the Z-axis and Y-axis. This embodiment differs from that shown in FIG. 3 only in that two pairs of Hall elements are provided, and therefore, a detailed description of its construction and operation will be omitted.

The above-mentioned first to ninth embodiments employ, as a declination detecting means, a pair or pairs of diametrically opposite Hall elements, but other magnetic detecting elements such as an MRE and the like can be employed in a similar manner, to construct such a detecting unit.

Figure 13:
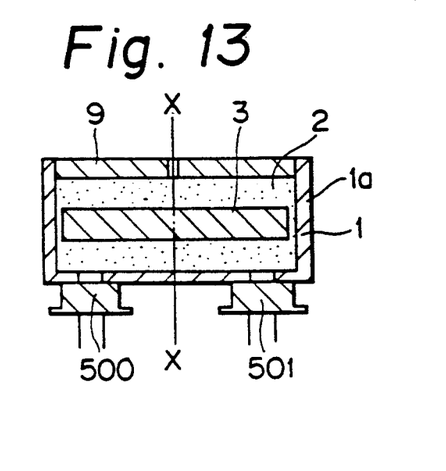
FIG. 13 is partial view of an essential part of a tenth embodiment of the present invention.

FIG. 13 illustrates a tenth embodiment of the present invention. In this embodiment, in place of the declination detecting Hall elements for detecting the declination of the permanent magnet 3, a pair of pressure sensors 500 and 501 are employed as the declination detecting means. The pressure sensors 500 and 501 are arranged on the casing 1 such that they are axially spaced from the permanent magnet and are symmetric with respect to the rotating axis X—X of the permanent magnet 3. When the angular velocity sensor is subjected to an angular movement about a diametric axis of the magnet 3, a varied density distribution of the magnetic fluid 2 in the casing 1 is obtained, causing a difference in the values of the pressure created, which values are detected by the pressure sensor 500 and 501, and it is possible to determine the angular velocity from this pressure difference. According to this embodiment, the detecting means for the detection of the mutual declination of the magnet and casing does not rely on the magnetic principle, and therefore, is advantageous in that it is free from measuring errors caused by the rotating magnetic field when rotating the permanent magnet 3 about its own axis.

In the above-mentioned embodiments, a three phase type all wave drive system utilizing a principle of the Hall motor is employed, but depending on the number of poles of the permanent magnet or the rotation speed required, other drive systems can be employed, including a four phase half wave drive system, three phase half wave drive system, two phase all wave drive system or multi wave drive system.

Figure 14:
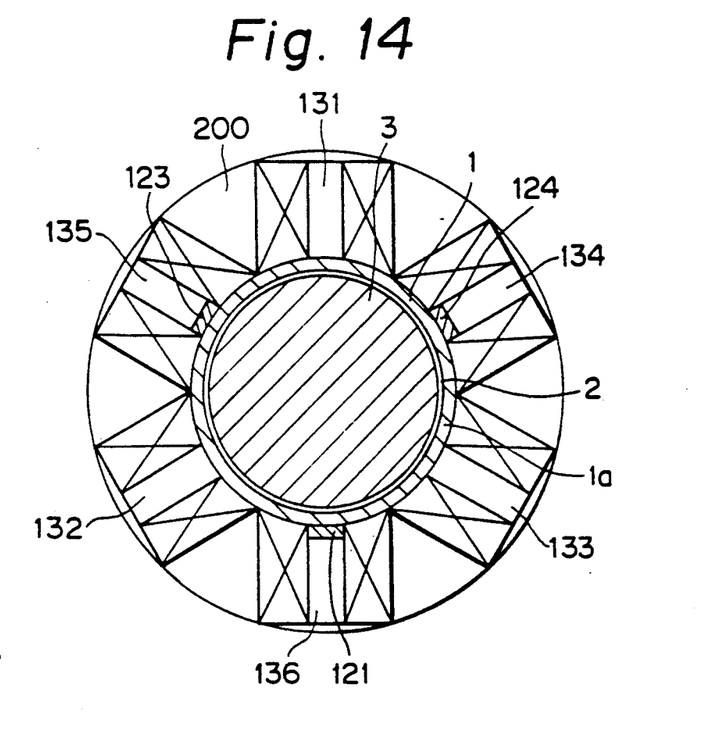
FIG. 14 is a view similar to FIG. 1 but showing an eleventh embodiment of the present invention.

FIG. 14 shows an eleventh embodiment of the present invention, wherein six rotating magnetic field generating coils 131, 132, 133, 134, 135 and 136 are employed. The construction of this embodiment is the same as that of the first embodiment, except for the arrangement of the rotating magnetic field generating coils. Basically, the drive system in FIG. 14 is a three phase all wave system, but the coils are arranged as three pairs of opposing coils, i.e., coils 131 and 136, 132 and 134, and 133 and 135, and the opposite coils in each pair are operated simultaneously to obtain a rotation without any unevenness of the rotation speed and torque obtained.

Figure 15:
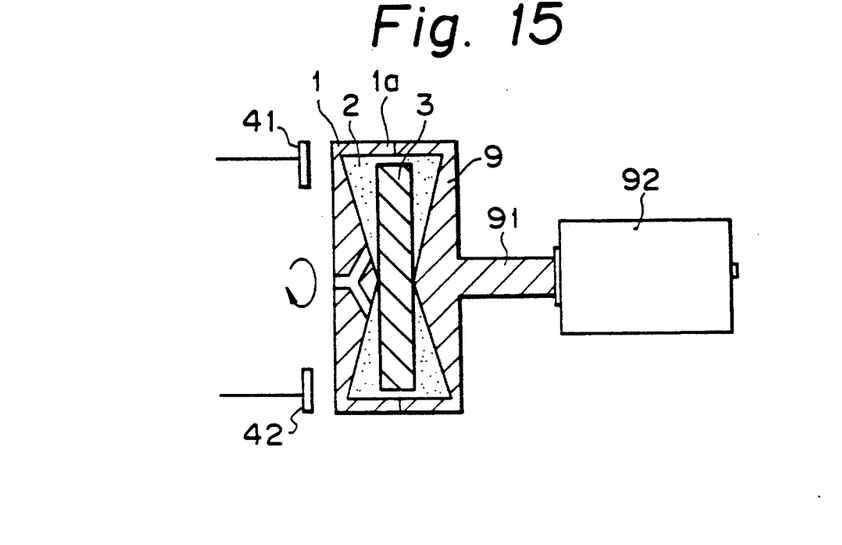
FIG. 15 is schematic view of a twelfth embodiment of the present invention.

Throughout the embodiments of the present invention, the rotating system for the permanent magnet is not necessarily limited to the Hall motor, and any other drive principle can be employed, including an electrical rotating motor. As shown in FIG. 15, the rotating container 1 is connected, via a coupling shaft 91 to a usual electric rotating motor 92, to directly impart a rotational movement from the motor 92 to the container 1. The rotation of the output shaft of the motor 92 causes the cylindrical container 1 to be rotated, which causes the permanent magnet 3 to be rotated via the magnetic fluid 2 stored in the container 1.

Figure 16:
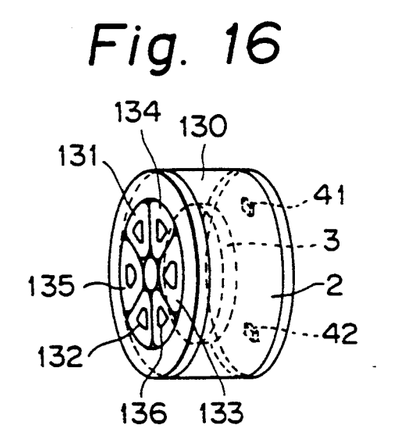
FIG. 16 is partial view of an essential part of a thirteenth embodiment of the present invention.

The thirteenth embodiment is shown in FIG. 16. In this embodiment sheet-shaped drive coils 131, 132, 133, 134, 135 and 136 and detecting Hall elements 41 and 42 are formed integrally with a cylindrical container 130 made of a ceramic material. This embedded construction of the sheet shaped coils and Hall element is advantageous in that the magnetic flux efficiency of the drive system, and the sensitivity thereof, are improved.

Figure 17:
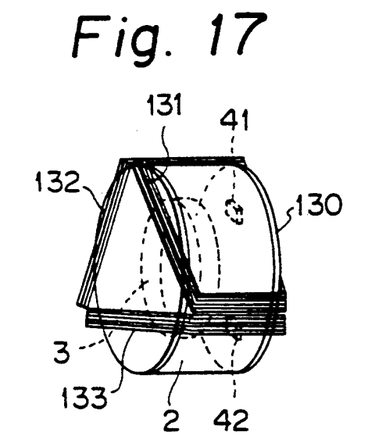
FIG. 17 is partial view of an essential part of a fourteenth embodiment of the present invention.

FIG. 17 shows a fourteenth embodiment wherein drive coils 131, 132 and 133 are constructed by windings wound directly around the cylindrical container 130, to increase the magnetic flux efficiency and sensitivity as in the thirteenth embodiment of FIG. 16.

In the embodiments explained hereinabove, the permanent magnet 3 has a circular disk shape, but it may have a shape other than that, such as a polygon or an irregular shape, as long as it is rotatable within the case.

Figure 18:
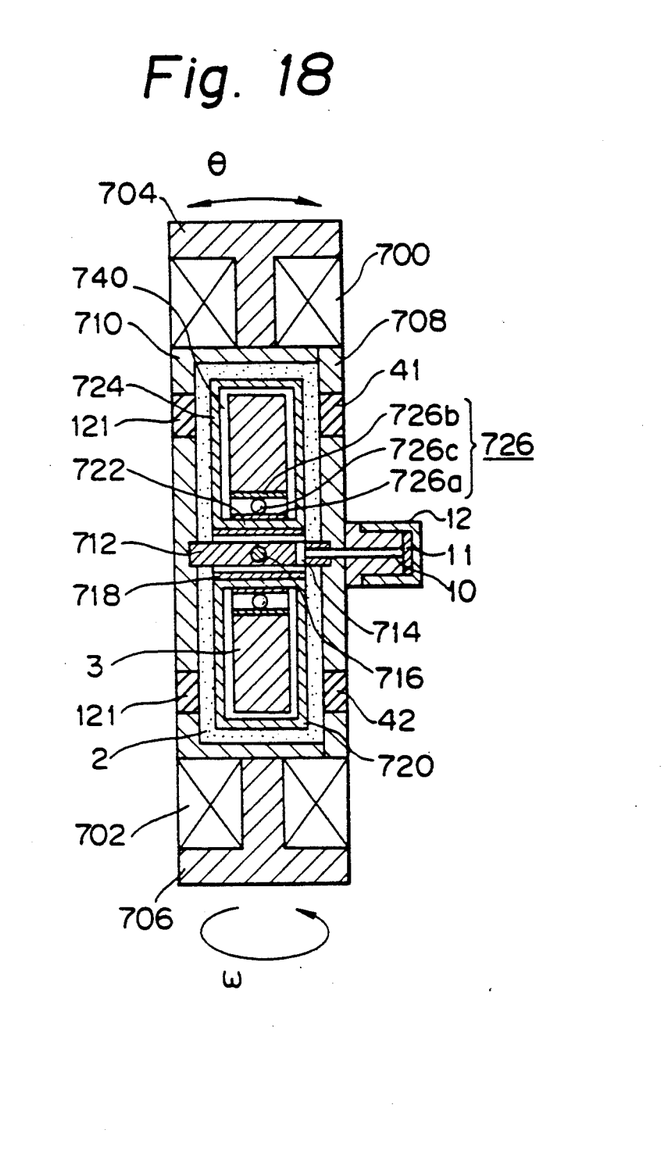
FIG. 18 is a cross-sectional view of a fifteenth embodiment of the present invention.
Figure 19:
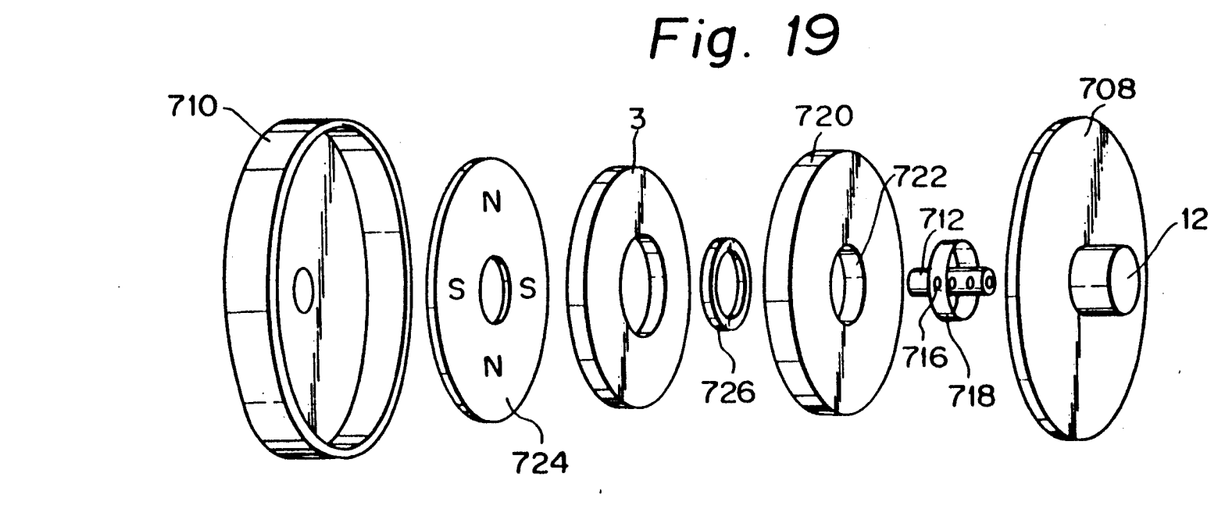
FIG. 19 is an exploded perspective view of the device shown in FIG. 18.
Figure 20:
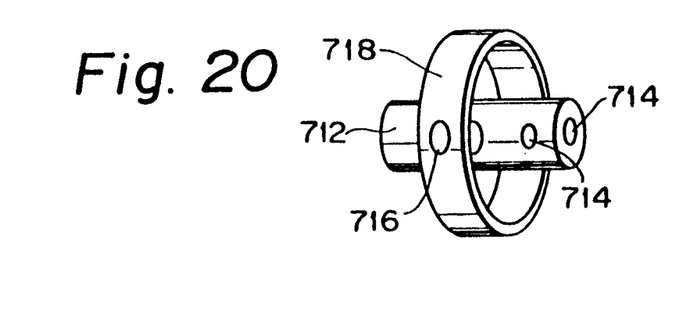
FIG. 20 is an enlarged scale schematic perspective view of a joint shown in FIG. 19.

FIGS. 18 to 20 show a fifteenth embodiment. Parts having functions similar to those described with reference to the previously explained embodiments are indicated by the same reference numbers, and a detailed explanation thereof is omitted. The drive coils 700 and 702, which function as a magnet rotating means, are provided with cores 704 and 706, respectively, an outer case cap 708 is connected to an inner casing 710, and an axial joint 712 is arranged centrally inside the casing 710, so that the ends thereof are fixedly connected to the casing 710.

The joint 712 is provided with a T shaped passageway 714, for filling the magnetic fluid 2 in a space formed between the inner and outer casings 720 and 710, and another joint 716 is connected to the first joint 712 so that these joints 712 and 716 are transverse to each other. A rotating ring 718 is rotatably connected to the ends of the second joint 716, and an inner case 720 together with an inner case cap 724 functions as a second casing. The inner casing is provided with a tubular portion 722 supported by the rotating ring 718. A donut shape four pole magnetized ring shaped permanent magnet 3 is supported on the tubular portion 722 of the inner casing 720 by a bearing unit comprised by an inner rail 726a, outer rail 726b and balls 726c. A chamber 740 is formed between the magnet 3, inner case 720 and inner case cap 724, in which a gas such as air is filled. Note, instead of filling same with gas, the chamber may be evacuated.

In the above embodiment of FIG. 18, an angular movement of an angular velocity as shown by an arrow W causes the permanent magnet 3 and the inner casing 720 to be declined with respect to the outer case 708 by the rotating ring 718 about the joint 716 until the precession torque is balanced with a spring force of the magnetic fluid 2. The rotation of the permanent magnet 3 supported by the bearing 726 takes place about the rotating axis thereof in the inner casing 720, without coming into contact with the magnetic fluid 2 in the outer casing 710, which prevents the generation of a contact resistance between the permanent magnet 3 and the magnetic fluid 3 as inevitably occurs in the previous embodiments. As a result, a quick response of the sensor is obtained, since a time needed for obtaining a predetermined rotating speed of the magnet member 3 after the sensor is energized is reduced. Furthermore, a high rotational speed of the magnet 3 is obtained, which allows the precession torque to be increased, and as a result, a large declination angle $\theta$ of the inner case 720 is obtained, to thereby provide an increased sensor output signal level.

Although the embodiments of the present invention are described with reference to the attached drawings, many modifications and changes can be made thereto by those skilled in this art, without departing from the scope and spirit of the present invention.

We claim:

1. An angular velocity detecting device arranged in a field to which an angular movement is applied, said device comprising:

a casing;

a magnetic fluid filled in the casing;

a magnetic member, having a first axis for rotation, and arranged inside the casing so that said magnetic member is freely rotatable about the first axis and inclinable with respect to the casing against an elastic force of the magnetic fluid and with respect to at least one second axis transverse to the first axis, upon the application of said angular movement;

means for rotating the magnetic member about said first axis, said rotating means being spaced from the magnetic member and not contacting the magnetic member;

means for controlling the rotating means for maintaining a constant rotational speed of the magnet member about the first axis;

means for detecting a degree of inclination of the magnetic member with respect to the casing while the magnetic member is rotated at the constant speed, and;

means for calculating an angular velocity of said angular movement in response to the detected degree of the inclination of the magnetic member with respect to the casing.

2. A device according to claim 1, wherein said magnetic member has a disk shape.

3. A device according to claim 1, wherein said casing is made of a non-magnetic material.

4. A device according to claim 2, wherein said casing is made of a non-magnetic material.

5. A device according to claim 1, further comprising means for limiting a translational movement of the magnetic member in a plane which is transverse to said first axis of the magnetic member.

6. A device according to claim 5, wherein said magnetic member forms an outer peripheral wall about the first axis, and the casing has an inner peripheral wall arranged adjacent to the outer peripheral wall of the magnetic member for limiting said translational movement of the magnetic member.

7. A device according to claim 1, wherein said rotating means comprise Hall elements and electric coils arranged in the casing and around the magnet member, the electric coils generating a magnetic field and the Hall elements detecting poles of the magnetic member.

8. A device according to claim 7, wherein a plurality of pairs of electric coils, which are energized simultaneously, are provided.

9. A device according to claim 1, wherein said rotating means comprises coils wound to the casing.

10. A device according to claim 1, wherein said rotating means comprise a motor mechanically connected to the casing for rotating the magnetic member via the magnetic fluid in the casing.

11. A device according to claim 1, wherein said inclination detecting means comprise at least one pair of Hall elements arranged symmetrically with respect to the first axis.

12. A device according to claim 11, wherein one of the Hall elements in said pair is arranged on one side of the magnets along the first axis, and the other Hall element is arranged on the other side thereof.

13. A device according to claim 1, wherein said inclination detecting means comprise at least one pair of diametrically opposing pressure sensors for detecting the pressure of the magnetic fluid in the casing.

14. A device according to claim 1, wherein said rotating means comprise Hall elements and electric coils arranged in the casing around the magnetic member, the electric coils generating a magnetic field and the Hall elements detecting poles of the magnetic member,
wherein said inclination detecting means comprise at least one pair of diametrically opposed Hall elements with respect to the first axis, and
wherein the casing is made of a ceramic material and all of the Hall elements and electric coils are formed integrally with the ceramic casing.

15. A device according to claim 1, wherein the casing has axially spaced apart inner walls and the magnetic member has axially spaced apart outer walls, one inner wall of the casing having a pair of opposing portions projected toward the facing outer walls of the magnetic member, respectively, along the first axis.

16. A device according to claim 15, wherein each inner wall forms a conical shape.

17. A device according to claim 16, further comprising opposing pairs of projections arranged symmetrically about the first axis and in contact with the magnetic member so that an inclination of the magnetic member about the second axis is allowed only about the second axis which lies in a plane wherein said pairs of projections are located.

18. A device according to claim 1, wherein the casing has axially spaced apart inner walls and the magnet member has axially spaced apart outer walls, one inner wall of the casing having a pair of opposing recesses, respectively, along the first axis, and further comprising a shaft connected to the magnet member along the first axis thereof, the shaft having opposite ends which are located adjacent to the corresponding recesses, respectively.

19. A device according to claim 18, wherein the inner walls of the casing have inwardly tapered portions.

* * * * *